May 8, 1934.  A. HAECK  1,957,954
PROCESS FOR PURIFYING OILS AND FOR CONVERTING INCOMBUSTIBLE
OILS INTO HOMOGENEOUS FUELS
Filed Nov. 30, 1932
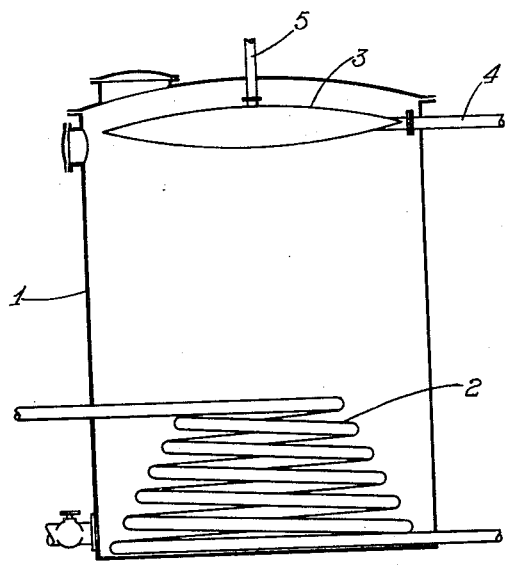
INVENTOR:
Auguste Haeck,
By his Attorneys,
Fraser, Myers & Manley.

Patented May 8, 1934

1,957,954

UNITED STATES PATENT OFFICE 1,957,954

PROCESS FOR PURIFYING OILS AND FOR CONVERTING INCOMBUSTIBLE OILS INTO HOMOGENEOUS FUELS

Auguste Haeck, Mariakerke, Belgium, assignor of one-half to Jean Spiltoir, Brussels, Belgium Application November 30, 1932, Serial No. 645,006
In Belgium December 7, 1931

4 Claims. (Cl. 196—1)

This invention relates to a process for purifying and homogenizing oils, whereby heavy and uninflammable oils, that is to say oils unsuited or little suited for combustion, may be converted into homogeneous and uniform fuels having all the characteristics required for their use in Diesel and semi-Diesel engines and in oil burners. By means of said process, remarkable results may be obtained in the treatment, in particular, of residual tar-oils, i. e. products remaining after primary oils have been distilled from tars, heavy oils of the Pechelbronn type, gas oils or the like substances hitherto held to be unfit for regular combustion or refractory thereto.

By my experimental work, I have been enabled to establish that the fuel constituents of oils exhibit an affinity for each other, whereas a certain degree of incompatibility exists between said fuel constituents and those components which are unsuitable for or harmful to regular combustion, among which paraffin, naphthalins and phenols, and compounds of creosote, of anthracene and of the pitches may be included. This discovery, taken in conjunction with the observation that heavy oils as well as bituminous materials undergo a physical conversion when heated to a moderate degree, forms the basis of the process according to my invention, wherein advantage is taken of said conversion in order to eliminate harmful constituents and impurities from said materials whilst rendering their fuel constituents homogeneous.

According to the invention, the oil under treatment is gradually heated to a moderate temperature, 70–100° C. for example, and is maintained at said temperature for several hours. After a certain time it is observed that the mass swells and that, from within the same, a constantly renewed upward movement urges towards the surface the heavier matters, the solid particles and the impurities. After four to six hours, the liquid mass consists of hydrocarbons the fluidity whereof has become very high and remains constant, whilst all of the constituents unfit for combustion concentrate in the upper layer. Immediately upon the surface of the liquid being then abruptly cooled, said upper layer stiffens into a film whose greater specific gravity causes it slowly to sink through and to the bottom of the liquid mass, carrying with itself the impurities and harmful constituents thereof. When said impurities and harmful constituents have been eliminated, by decantation or otherwise, the resulting mass of refined liquid is much more homogeneous than before, and burns more uniformly.

It is possible to promote and, in many cases, to improve said process of purification and homogenization by adding at the outset of the same a suitable quantity of another oil, preferably possessing characteristics complemental to those of the oil under treatment, as explained hereinafter. It is then observed that the intimate mixing of the said two oils, brought about by protracted heating at a moderate temperature, causes their constituents to interpenetrate and thus to form an ultimate oil of a quality greatly superior not only to that of the oil initially subjected to treatment, but likewise to that of any oil which could be prepared by mixing said two oils at the ordinary temperature.

Said auxiliary oil, selected according to the nature of the oil to be treated, may be used in quantities ranging for example from one twentieth to one quarter the volume of the latter. By adding an oil which is richer in volatile hydrocarbons to a heavy oil, unfit for combustion, and by treating it as described, said heavy oil may be converted into a homogeneous fuel. On the other hand, if the oil to be treated is readily inflammable but does not burn evenly, a denser oil is added. It is to be understood therefore that the properties of the added oil are complemental to those of the oil under treatment from the point of view of the requirements for good and complete combustion, the added oil being intended to supply to the first oil the elements which are lacking in order to obtain a product which will burn smoothly and evenly.

The process may be applied in practice, at a moderate cost, by means of a very simple plant comprising a closed vessel having gentle heating means at its lower portion and cooling means at its upper portion, said means consisting respectively, if desired, of a steam heated coil and of a water-cooled coil.

In the accompanying drawing I have illustrated, by way of example, in sectional elevation, an apparatus suitable for carrying out the process according to my invention.

In the drawing 1 is the receptacle for the oil, 2 a heating coil which may be fed with hot water or steam, and 3 a cooler comprising a flat container (or it may be a coil), provided with an inlet pipe 4 adapted to be connected with a source of cold water or other fluid, 5 being an outlet pipe for said fluid.

By way of example, I shall describe the application of this process for the conversion of a residual tar-oil, obtained from coke-ovens, which oil is unfit for combustion, and shows under analysis:

| | |
|---|---|
| Specific gravity at 15° C | 1.073 |
| Point of combustion | 110° C. |
| Engler viscosity at 20° C | 1.81° E. |
| Engler viscosity at 50° C | 1.33° E. |
| Sulphur | 0.72% |
| Hard asphalts | 0.74% |
| Gross heating power | 9271 cal/gr. |

85 kg. of the above oil having been poured into the vessel, the latter is slowly warmed to 30° C. aapproximately, whereupon 15 kg. of gas-oil is added therein, having the following characteristics:

| | |
|---|---|
| Specific gravity at 15° C | 0.865 |
| Point of ignition | 105° C. |
| Point of combustion | 118° C. |
| Engler viscosity at 20° C | 1.63° E. |
| Engler viscosity at 50° C | 1.25° E. |
| Sulphur | 0.17% |
| Ash | 0.008% |
| Gross heating power | 11010 cal/gr. |

The mixture is then slowly so heated by means of coil 2 that the whole mass thereof gradually reaches 80° C. at the end of four hours, this temperature then being maintained for four further hours. By the end of this period, the mass will have become very liquid, and will have expelled the impurities or constituents unfit for consumption wherewith it was closely bound, said impurities being kept at the surface by the currents rising through the mass.

The cooling means are then brought into action by causing a liquid to flow through the cooler 3 at a lower temperature. As has been explained, a film thereupon forms immediately, which slowly precipitates at the bottom of the vessel the greater part of the solid, incombustible or harmful substances contained in the mass being cooled.

Upon completion of the treatment above described, lasting about 48 hours, the clear liquid may be decanted. Said liquid, having a volume equivalent to 90–95% of the initial mass treated, is a homogeneous and regular fuel, fit for use in slow combustion engines or in burners, without any further treatment whatsoever.

In the case of the example under consideration, 90 kg. of ultimate product was yielded, having the following characteristics:

| | |
|---|---|
| Specific gravity at 15° C | 1.015 |
| Point of combustion | 107° C. |
| Engler viscosity at 20° C | 1.77° E. |
| Engler viscosity at 50° C | 1.25° E. |
| Sulphur | 0.60% |
| Hard asphalts | 0.58% |
| Gross heating power | 9802 cal/gr. |

The remaining 10 kg. may be made to yield a further 5 kg. of satisfactory product, by renewed decantation. The 5 kg. of residue then left contain the so-called impurities consisting of incombustible anthracene oil, creosote, asphalt, precipitated dusts, and pyrogenous substances.

The process hereinbefore described may be applied to residual oils of every kind, especially to those left as the residue of the treatment disclosed in my co-pending patent application, Serial No. 645,005, filed November 30, 1932.

The particulars hereinbefore set forth concerning, in particular, the nature of the products used and the temperature and duration of the treatment may of course be varied according to circumstances, without departure from the scope of the invention.

I claim:

1. In a process of improving the homogeneousness of oils unfit for even combustion and carburation, slowly heating the oil to a temperature not exceeding 100° C., maintaining said temperature for a time sufficient to bring impurities to the surface of the oil, then abruptly cooling said surface, causing the formation of a superficial film on the oil, and allowing the oil to cool slowly while said film precipitates and carries the impurities to the bottom.

2. In a process of improving the homogeneousness of oils unfit for even combustion and carburation, gradually heating the oil for several hours until a temperature between 70° and 100° C. is reached, maintaining the final temperature for several hours until impurities are brought to the surface of the oil, then chilling said surface causing the formation of a superficial film thereon, and allowing the oil to rest while slowly cooling for about 48 hours to cause said film to precipitate and carry the impurities to the bottom.

3. In a process of improving the homogeneousness of oils unfit for even combustion and carburation, adding to the oil to be treated an auxiliary oil having characteristics complemental to those of the first mentioned oil from the point of view of the requirements for good and complete combustion, slowly and gradually heating the mixture of said oils to a temperature not exceeding 100° C., maintaining said temperature for a time sufficient to bring impurities to the surface of the heated mixture, then abruptly cooling said surface, causing the formation of a superficial film thereon, and allowing the mixture to cool slowly while said film precipitates and carries the impurities to the bottom.

4. In a process of improving the homogeneousness of oils unfit for even combustion and carburation, adding to the oil to be treated about 5 to 25% of an oil of lower specific gravity, slowly and gradually heating the mixture of said oils to a temperature between 70° and 100° C., maintaining said temperature for a few hours, then abruptly cooling the surface of the oil mixture, causing the formation of a superficial film thereon, allowing the mixture to cool slowly and causing said film to precipitate and carry the impurities to the bottom.

AUGUSTE HAECK.